United States Patent [19]
Engelhaupt

[11] Patent Number: 5,817,422
[45] Date of Patent: Oct. 6, 1998

[54] OPTICAL APPARATUS HAVING A HIGHLY DIFFUSIVE METAL SURFACE LAYER

[75] Inventor: Darell E. Engelhaupt, St. Cloud, Fla.

[73] Assignee: Martin Marietta Corporation, Bethesda, Md.

[21] Appl. No.: 795,984

[22] Filed: Feb. 5, 1997

Related U.S. Application Data

[62] Division of Ser. No. 471,450, Jun. 6, 1995, which is a division of Ser. No. 206,371, Mar. 4, 1994, which is a division of Ser. No. 844,969, Feb. 28, 1992, Pat. No. 5,326,454, which is a continuation of Ser. No. 92,738, Aug. 26, 1987, abandoned.

[51] Int. Cl.⁶ ..................................................... B32B 15/04
[52] U.S. Cl. ........................ 428/457; 428/208; 428/607; 428/699; 428/702; 205/111

[58] Field of Search ...................................... 428/469, 472, 428/472.1, 699, 702, 209, 210, 577, 604, 607, 457; 205/111, 112

[56] References Cited

U.S. PATENT DOCUMENTS 4,568,431  2/1986  Polan ......................................... 204/13

Primary Examiner—Timothy M. Speer
Attorney, Agent, or Firm—Kenyon & Kenyon

[57] ABSTRACT

A method is disclosed for the production of highly diffusive or absorptive metal surfaces. A dendritic crystal structure surface layer of metal is electrodeposited on a substrate, using a bipolar pulse plating technique. This metal surface layer may then be oxidized to provide a highly anti-reflective surface.

6 Claims, 3 Drawing Sheets

OPTICAL APPARATUS HAVING A HIGHLY DIFFUSIVE METAL SURFACE LAYER

This is a divisional application of U.S. patent application Ser. No. 08/471,450 filed Jun. 6, 1995, which is a divisional application of U.S. patent application Ser. No. 08/206,371 filed Mar. 4, 1994, which is a divisional application of U.S. patent application Ser. No. 07/844,969 filed Feb. 28, 1992, now U.S. Pat. No. 5,326,454 issued on Jul. 5, 1994, which is a continuation application of U.S. patent application Ser. No. 07/092,738 filed Aug. 26, 1987, now abandoned.

FIELD OF THE INVENTION

The present invention relates to methods for the preparation of metal coatings with selected radiation/optical properties, by electrodeposition of a metal on a substrate, using a bipolar time variant current to alternately deposit and redissolve (or etch) metal to obtain a novel surface with microscopic asperities which alter the optical properties.

BACKGROUND OF THE INVENTION

A variety of coating materials exist for optical application where it is desired to maximize absorption while minimizing reflectance of light or electromagnetic radiation. Most of these previous coating materials have certain limitations and faults.

One previous absorption material has been thick black paint, which has a tendency to crack or separate from a metal substance under thermal cycling conditions. Since many infrared instruments are subject to frequent thermal cycles, paint separation can be a significant problem. Paints, or coatings in general which have organic binders, are sometimes unsatisfactory because they are degraded by temperatures above 400° C. For increased absorption at longer wavelengths, thicker layers of paint are needed. An increase in the paint thickness aggravates the cracking or separation problem. Additionally, paints outgas losing up to 10 percent by weight after vacuum exposure. Some of the chemicals which outgas can be highly corrosive to microelectronic components. Furthermore, in a cryogenically cooled optical system, outgassed chemicals may condense onto cooled optical surfaces. Moreover, most infrared absorbing paints contain carbon black, and recent experiments have shown that carbon black reacts with the five electron volt atomic oxygen prevalent at low earth orbits.

Anodized coatings have also been utilized in the context of the present invention, such as those of Wade et al, U.S. Pat. No. 4,111,762 and Pompea et al, U.S. Pat. No. 4,589,972, both of which are incorporated herein by reference.

Wade et al teaches a basic anodization method for preparation of light-absorbant materials wherein an anodizable work piece is cleaned, vapor honed, rinsed, masked, etched, anodized, rinsed, surface dyed, rinsed, hot water sealed, and (optionally) vacuum dried. The surface prepared by this method comprises an oxide layer, e.g., $Al_2O_3$, having an outermost dyed region of spire-like surface features.

The anodized optically black surface produced in accordance with U.S. Pat No. 4,111,762 eliminates the concerns of outgassing and adhesion noted above. Its effectiveness on surfaces for infrared instruments depends largely upon its ability to scatter or diffuse incident radiation. Recently, there has become a need for improved infrared absorption for infrared instruments and detectors, particularly for wavelengths from about 35 microns to about 1,000 microns. If the surfaces on an infrared instrument specularly reflect infrared radiation, the resultant off-axis stray light that hits the detector can reduce the signal-to-noise ratio. Absorption in the far infrared region has become even more important now that certain detectors and instruments have improved sensitivity into the far infrared region up to 1,000 microns.

Pompea et al modify the method of Wade et al in two ways: first by adding a major surface modification step such as photoetching, prior to anodization to produce relatively large surface craters, depressions, and indentations; and second, by using steam sealing rather than hot water sealing. The resultant surface of Pompea et al has improved capability for absorbing and reducing specular reflectance of electromagnetic radiation in the wavelength range of from about 1 micron to about 500 microns or higher. The method, however, is subject to certain restrictions and limitations such as specular reflectance peak values encountered at wavelengths below 5 microns and above 1 micron, and fragility. Also, this procedure is not applicable as a coating process to be used for substrates other than the parent metal of the component.

In addition, various other electrodeposition methods are known, such as taught by Smith, U.S. Pat. No. 2,559,263, incorporated herein by reference, for providing on the surface of silver, copper, or brass plates a highly brilliant polish. This, according to Smith, is done by means of electropolishing the surface anodically in an electrolyte whereby a composite voltage made up of a direct current potential and an alternating current potential is intermittently applied to the electrodes.

In U.S. Pat. No. 3,929,563, of Sugiyama et al, incorporated herein by reference, a method is disclosed for providing a colored oxide film on an aluminum material by means of placing the aluminum in an electrolytic bath containing a metallic salt, and applying a voltage of either positive or negative pulse waveform for a period of time to produce an oxide surface layer.

Another pulse plating method is taught in U.S. Pat. No. 4,147,595, of Shigeta et al, incorporated herein by reference. Shigeta et al disclose a method for producing colored oxide films on aluminium materials by dipping the aluminum material having an anodic oxide film thereupon into an electrolytic bath containing boric acid and water soluble nickel salt, and subsequently applying alternating voltage pulses with the negative pulse voltage and duration being longer than the positive pulse voltage and duration. In this manner, Shigeta et al alternately draw coloring metal ions into the pore structures during the negative voltage cycle, and educe the coloring metal ions during the lower voltage and duration positive pulse.

In U.S. Pat. No. 4,361,630 of Johnson, incorporated herein by reference, a method is taught for producing a ultra-black surface coating with an extremely high light absorption capability on a variety of substrates, this surface coating being produced by preferential chemical attack on an electroless nickel-phosphorous alloy deposited on the substrate in a bath consisting of aqueous nitric acid solution. This resulting blackness of the surface coating is associated with a multitude of microscopic conical pores etched perpendicularly into the surface. This surface however has less than the desired absorptance of light at low angles of incidence.

SUMMARY OF THE INVENTION

All of the above methods for providing anti-reflective coatings have problems or deficiencies, such as high cost, narrow wavelength or bandpass effectiveness, poor resistance to surface abrasion, fragility, poor low angle absorptance, etc.

Accordingly, it is a purpose of the present invention to provide a method for depositing a surface coating having extremely high specific area, which coating is highly adherent to the substrate.

It is another object of the invention to provide a method for applying to a wide variety of substrates a coating material having very high diffusivity. A still further object of the invention is to provide a strongly adherent optical coating providing a highly absorptant, anti-reflective surface capable of withstanding reasonable handling stress.

These and other objects are achieved by the process of the present invention. A metal coating is electroplated upon a chosen substrate utilizing bipolar pulse plating techniques to obtain a surface with surface asperities which alter optical properties, specifically diffusivity. This coating, comprising for example a copper layer having dendritic crystal growth at the surface, is then oxidized to superimpose a secondary black, cupric oxide, highly absorptant surface over the dendritic surface. The resultant coating may hereinafter sometimes be referred to as an EAS surface.

The process is broadly applicable to a wide variety of substrate materials and shapes, and by appropriate control of electroplating chemistry and technique, may result in surfaces having vary uniformly low reflectance values over a very wide bandpass.

DESCRIPTION OF THE PREFERRED EMBODIMENTS

In the electroplating arts, a wide variety of processes and bath compositions are known for the deposition of metal coatings on substrates. One such process is broadly referred to as pulse plating.

The fundamental concept of pulse plating is the periodic interruption or reversal of the plating current for short periods of time. If the perturbations are controlled within certain limits, the solution directly in contact with the substrate being plated will be enriched in metal cations, thereby permitting higher instantaneous plating rates during the plating, or forward, portion of the waveform. This, in turn, permits a high nucleation rate and generally yields deposits of finer grain structures and enhanced physical properties. As a result, geometric irregularities, which generally prohibit uniform deposits, are also less troublesome, permitting deep, small recesses to be more uniformly plated..

In the present invention, a chosen electrodeposited metal, such as copper, is applied to a solid substrate, such as a circuit board or metal part, The coating is altered by application of a modified waveform electrical current during the electrodeposition process. By alternately reversing the plating current from anodic to cathodic, under selected electrochemical conditions, a dendritic electroplated surface of metal is produced on the substrate.

The surface generated has a very high specific area consisting of redundantly smaller crystallites formed by superimposed concurrent cathodic deposition of crystallographic grains and anodic etching of grain boundaries and cleavage planes within the growing crystalline structure. This structure is subsequently oxidized to form a submicron secondary structure superimposed on the larger grain dependent surface. The combined properties of the electroplated dendrites and the oxides produce a microscopic "forest" on the substrate surface. This coated surface has broad band radiation absorbance from ultraviolet through far infrared, and excellent non-incident trapping of near infrared radiation. The dendritic fern-line crystallites, which exhibit a fractal growth pattern, consist of durable, high purity metal, and have good physical properties, such as relatively high abrasion resistance, and high thermal conductivity in the case of copper.

As used herein, the term "substrate" shall refer to the surface, part, or item to which a coating may be applied in accordance with the present invention. It is important to recognize that any substrate which is capable of being electroplated is suitable for use. Thus, one may apply an anti-reflectance surface to substances such as metals, e.g., copper, nickel, steel, aluminium, pre-plated metals, epoxy-fiber glass circuit boards, glass, etc. While it may be necessary to apply a base layer or intermediate coating to some substrates, any substrate which is capable, with common masking and plating techniques, of withstanding bath temperatures of above 150° F. (65° C.) may be used. For example, aluminum may be autocatalytically plated with nickel to improve adhesion, and a copper surface layer then may be applied, Similarly, glass may be treated in accordance with this invention by first applying a vacuum deposited layer of silver, for example, prior to the electroplating of copper.

It must also be noted that this invention is applicable to any shape or configuration substrate, however complex. Through appropriate masking techniques, it is also possible to apply an anti-reflectance surface to limited areas of substrate, or in specific orientation of dendrites, so as to achieve selective effects in anti-reflectance capability, such as coating one side of an electronic component housing.

Still further, it is possible to prepare a free-standing, self-supporting article by conventional electroforming techniques, and then, without changing electroforming bath, by the method of this invention, apply a highly diffusive dendritic surface, which may then be oxidized to a highly anti-reflectant surface. Thus, by proper design of a base form, mandrel, or substrate, one may directly electroform and surface coat very complexly shaped items having selectively diffusive or anti-reflectant surfaces.

It is also to be noted that the invention may also be used in conjunction with conventional common lithographic and photolithographic processes, such as used in printed circuit manufacture, to prepare virtually any predetermined pattern of anti-reflective surface coating upon a substrate, with suitable masking, as appropriate. Thus, various patterns of anti-reflective areas may be created on a substrate, with an oxide overlayer applied uniformly over the entirety of the body, or over merely the anti-reflective areas of dendritic metal. Such patterns may, of course, be applied to conductive metal substrates, using conventional masking techniques, as well as to nonconductive circuit board.

Discussion of the invention herein shall focus on the application of a copper surface layer to a substrate, but it is to be understood that other metals may be utilized, with the appropriate procedural modifications. Such modifications would be known to one skilled in electroplating arts. Appropriate metals to be applied to substrates include all those capable of highly efficient electrodeposition and subsequent alternate etching to create a dendritic crystal growth, which can be subsequently oxidized or coated with a metal which can be oxidized. Suitable electroplated metals include copper, silver, gold, nickel, cobalt, cadmium, iron, etc. Choice of the electrodeposited metal may depend, in part, on the grain size desired in the absorptant surface. Thus, a surface for absorptancy of x-rays or ultraviolet radiation would dictate formation of a relatively fine dendrite structure. The dendrite size is dependent upon the inherent crystal size of the metal being deposited, and one skilled in the electroplating arts will recognize the range of applicable materials for specific wave band absorptancies.

The preferred copper deposition bath compositions are such that excessive oxidation or reduction of process chemicals with not occur, such as those which comprise no organic additives, although copper plating baths containing saccharide brighteners are the most preferred. In general, any plating bath which does not break down under bipolar pulse plating conditions may be utilized.

Figure 1:
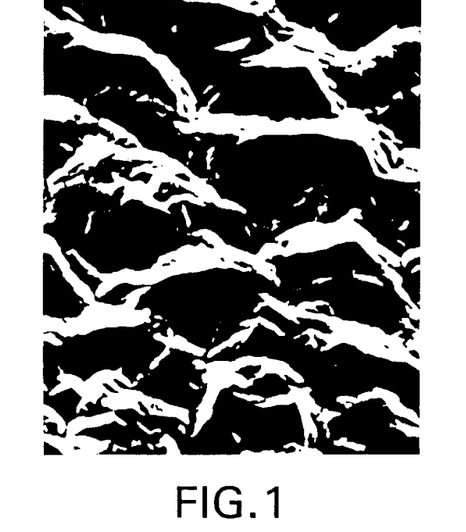
FIGS. 1, 2 and 3 are photomicrographs of surfaces prepared in accordance with the present invention.
Figure 2:
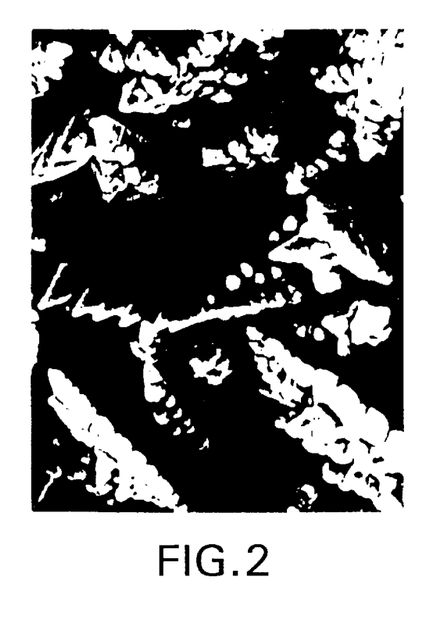
Figure 3:
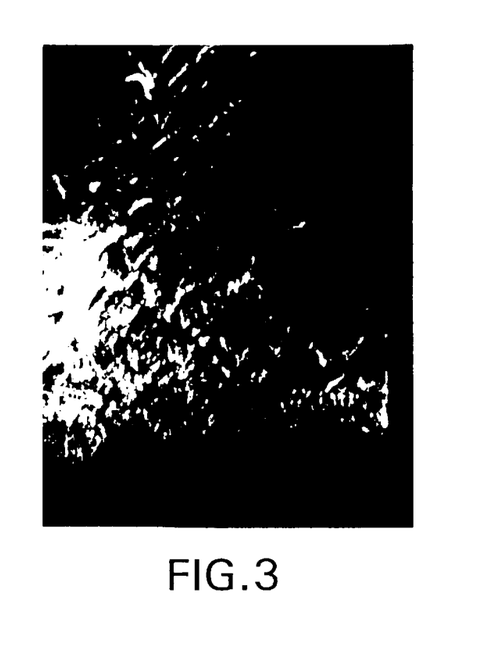

Electroplating of the surface layer under pulse plating conditions may be carried out for periods of time up to about 4 to 6 hours, depending upon thickness of coating sought. Preferably, deposition takes place for about 30 minutes to about 4 hours. The specific surface area achieved may have a microgeometric ratio of about 1000:1 or more, dependent upon specific conditions utilized. A high microgeometric surface area is apparent in FIGS. 1 through 3. FIG. 1 demonstrates a photomicrograph of a nickel surface layer applied in accordance with the present invention, at a magnification of 2000×. FIGS. 2 and 3 are photomicrographs of a copper oxide layer prepared in accordance with this invention, at magnifications of 1000× and 5000×, respectively. FIG. 2 clearly illustrates the tree-like growth of dendritic crystals, while FIG. 3 demonstrates the very fine, fern-like, growth of submicron crystals on individual spires or dendrites.

Surprisingly, the dendritic crystal surface coating, even after oxidation, has been found to be relatively resistant to abrasion and to "finger-printing" due to handling and may be subjected to normal cleaning techniques, including ultrasonic, for removal of impurities such as oil. The coating may be subjected to water rinsing at pressures up to about 80 psig, demonstrating its inherent strength. Thus, if the surface becomes "finger-printed" by contact with perspiration or skin oils, the surface may be ultrasonically cleaned to remove the oil. If the oxide surface is abraded, or the dendritic structures crushed by excessive pressure, the damaged area may be removed by dissolving in an acid or an oxidizing alkaline solution, and the substrate reoxidized to yield a continuous evenly distributed oxidized dendritic surface. Also, if the substrate is acid resistant, the entire plated surface may be replaced.

In preparing the substrate for electroplating, conventional cleaning techniques may be utilized, as are recognized in the electroplating arts, dependent upon substrate and metal to be deposited. Similarly, conventional cleaning methods, including ultrasonic, may be used for cleaning the coated surface, either before or after oxidation.

In general, the substrate must be properly cleaned, non-reactive to the deposition bath, and conductive or rendered conductive by a suitable process such as chemically reduced copper or nickel. Thus, a metal or metal coated substrate may be prepared for plating by alkaline electrocleaning, soaking in ammonium persulfate, spray rinsing, soaking in 5 to 10 volume percent sulfuric acid, and again spray rinsing in deionized water.

The copper plating bath may be composed, for example, of the following components, as set forth in Table 1.

TABLE 1

Common Copper Plating Bath

| Component | Range | Preferred |
|---|---|---|
| Copper Sulfate ($CuSO_4 \cdot 5H_2O$) | 90–130 gm/L | 110 gm/L |
| Sulfuric Acid (C. P. 98% vol.) | 90–125 ml/L | 114 ml/L |
| Chloride (HCl by Vol.) | 30–50 µl/L | 47 µl/L |
| $H_3PO_4$ | 10–30 ml/L | 20 ml/L |
| Harshaw NP-A* | 60–90 µl/L | 78 µl/L |
| Harshaw CX-B* | 10–20 ml/L | 15 ml/L |

*Harshaw NP-A and CX-B are trademarks of Harshaw Chemicals Corporation for copper plating process chemicals.

It has been found that varying the plating conditions will result in variations in the dendritic structure obtained. It has also been found that a fundamental base layer should preferably be applied to the substrate by direct current plating for a short time period at a current density typically from about 10 to about 40 $mA/cm^2$, preferably at about 30 $mA/cm^2$, to form an acicular structure with fine grain size, which is relatively hard and strong.

A very high absorptance to broadband light radition is obtained when the copper surface is properly prepared. The appropriate surface may be viewed using a stero SEM at 500 to 2000 magnification with 10 to 12 degrees viewing angle between the pair.

It has been found that increased depth of dendritic structure may be obtained by increasing plating time at low frequency, i.e., 7 to 10 Hz. A finer structure is obtained by increased frequency, i.e., 11 to 15 Hz. In general, deposition of the dendritic structure should take place at a frequency of from about 5 to about 20 Hz, for a time period of up to about 4–6 hours, dependent upon the desired structure and thickness.

Bare spots are indicative of poor cleaning of the substrate, resulting in poor optical absorptancy. The presence of hillock dendrites, lacking in redundant fractal reproduction of fern-like structures, is indicative of plating solution control problems.

While far infrared properties may be improved by increased dendrite size, visible or ultra-violet absorption may be improved by increased oxide immersion or oxidation of the dendritic structure. In general, it has been found that alteration of applied current, frequency, anodic/cathodic ratio, and bath chemistry will produce surfaces various decreased absorption peaks.

An appropriate ammonium persulfate etch bath composition comprises about 160 grams/liter ammonium persulfate, with about 9.0 ml/L sulfuric acid, balance water.

Conventional oxidizing or post plating techniques may also be utilized, such as anodizing, chemical oxidant, or nitriding, to provide additional broadband light trapping capability and atmospheric corrosion resistance. A suitable commercial oxidizing process, such as Roblack CU #12800, of McGean Rohco, Inc., may be used, but a preferred process is oxidizing with a bath comprising 2 Normal sodium hydroxide (reagent grade) at a temperature of from about 150° F. (65° C.) to about 205° F. (96° C.) with an anodic current density of from 20 to 75 $mA/cm^2$, for 5 to 10 minutes. Additional dentritic oxide growth may be obtained by applying the bipolar pulse plating technique to thus bath.

Preferred oxidizing conditions with this bath comprise a temperature of about 180° F. (82° C.), and a current density of about 30 mA/cm$^2$ for about 7 minutes.

When using commercial oxidizing techniques, such as the Roblack Cu, the following operating parameters are recommended: 20 to 25 percent concentration of the Roblack, at a temperature of from about 200° F. (93° C.) about 205° F. (95° C.), with mild stirring.

It is also to be noted that great variation of surface character is achievable with this invention, since one may create new surface formations by changing plating waveform in process. Thus, one may create a high surface area layer over a lower surface area deposit by merely changing electrodeposition parameters while in progress. That is, very fine fern-like crystals may be deposited upon larger dendritic spires by changing wave form during the deposition. Such variations are, of course, most readily achieved by use of a properly programmed computer, interfacing with a programmable function generator which then drives a bipolar operational amplifier. Such computer system permits one to obtain highly replicable results, as well as permitting operations in real time. For example, one may program the computer to control all electrical variables, and to deposit a copper base layer, then to deposit a copper dendritic structure for a specified time period, and then to shut off automatically. The coated substrate may then be removed from the electrodeposition bath, perhaps the next work day, and subjected to rinsing and oxidation.

Objects having the surface characteristics obtained in accordance with the process of the present invention can be used in a wide variety of applications where extremely high specific area, broadband spectral absorption, environmental resistance, or highly diffused reflectance are important. Some of these applications include infrared calibration reference sources or detectors, spectrophotometry, optical instruments, radiometers, solar panels, laser system stray light control, thermal imaging systems, heat sink, coolers, diffusers, catalysts, calorimeters, etc. Uses for optical coatings made in accordance with the present invention include interior surfaces of telescopes, binoculars, camera bodies, and the like, where reflected radiation will interfere with absorption or measurement of the radiation of concern.

The present invention offers a low cost, efficient method for producing, on almost any size or shape of body or substrate capable of being electroplated, a durable, high specific area coating of metal or metal oxide. Aside from desirable optical properties, such surface layers offer utility as catalytic surfaces and for bonding surfaces. For example, improved adhesion between two metals being adhesively bonded to each other may be achieved by applying a high surface area dendritic surface layer to either or both substrates in accordance with this invention, prior to bonding.

The following examples are illustrative of the invention, but should not be considered as limitations upon the scope thereof

EXAMPLE 1

A dendritic electroplated surface is produced by alternately reversing the plating current from anodic to cathodic under specified conditions. The substrate plated is a copper clad circuit board, soiled by handling. The substrate is cleaned in the following manner:

(a) Scrub with pumice, rinse with deionized water (b) Alkaline cathodic electroclean, rinse (c) Soak 2 minutes in ammonium persulfate cleaner (d) Rinse in spray, or ultrasonic rinse (e) Soak in 5–10 volume percent sulfuric acid, 1 minute (f) Spray rinse The substrate is then immersed, without intermediate drying, in an electrolytic bath comprising the preferred composition set forth in Table 1. Plating fixtures are attached, and direct current is applied for 5 minutes at 20 mA/cm$^2$. The current is then changed to a 7 cycle per second sine wave alternating current at 175 mA/cm$^2$, offset to apply 100 mA/cm$^2$ cathodic peak and 75 mA/cm$^2$ anodic peak. This monitored by oscilloscope. The copper plating rate is about 1.18 grams per ampere hour net cathodic current.

The sample is removed after four hours plating, rinsed ultrasonically in deionized water, soaked for 10 seconds in ammonium persulfate cleaner, rinsed in hot (95°–100° C.) deionized water, rinsed ultrasonically in room temperature deionized water, and blown dry with nitrogen.

The highly diffusive, satin finish copper coated substrate is then oxidized to a black oxide coating by immersing in Rohco Roblack Cu for 15 minutes at 95°–98° C., rinsing in hot (95°–100° C.) deionized water, rinsing in room temperature deionized water, and blowing dry with clean air or nitrogen.

Figure 4:
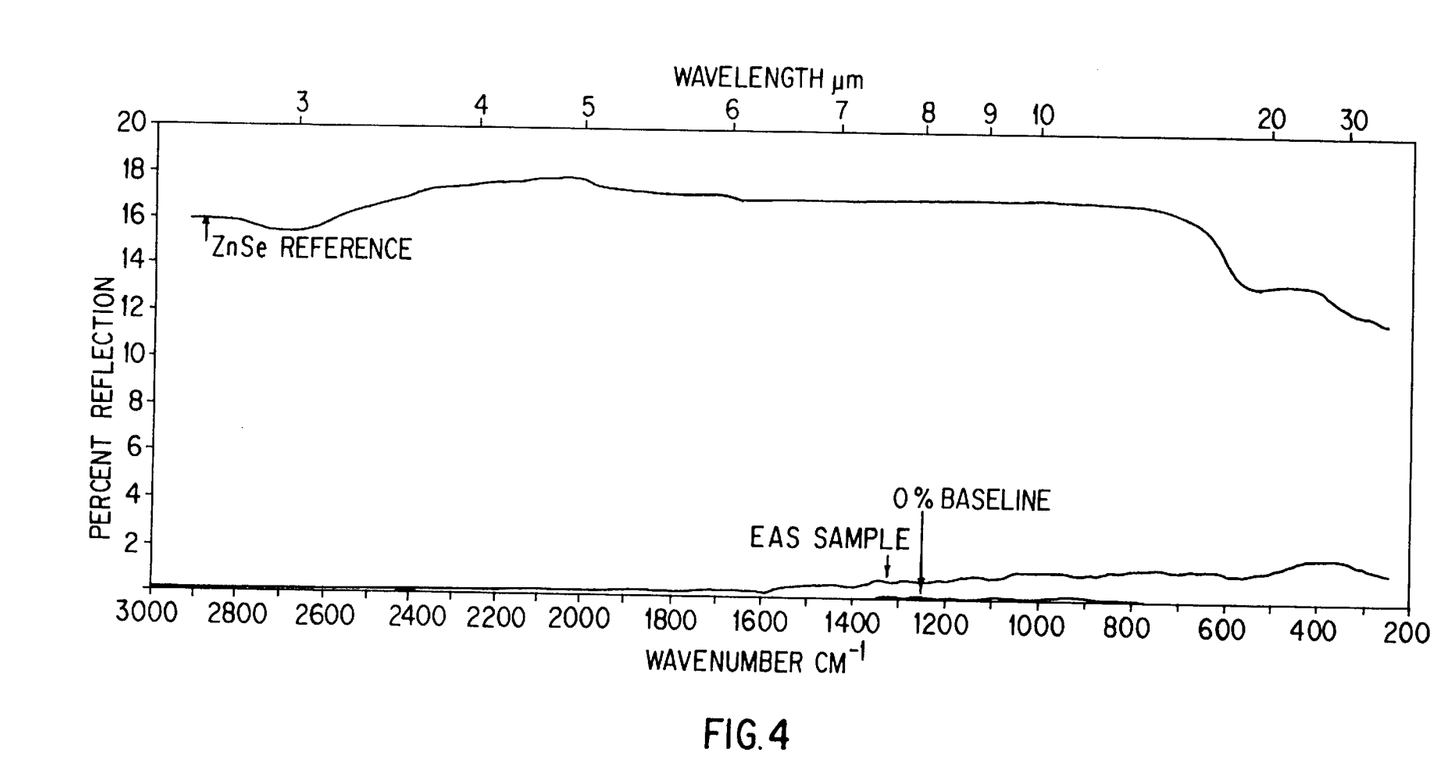
FIG. 4 is a graph of total integrated scatter from 2.5 micrometers to 50 micrometers for a surface prepared in accordance with this invention.

The sample is then inspected for optical properties. As illustrated in FIG. 4, broadband total integrated scatter (TIS) of 1.0 percent or less is obtained from 2.5 micrometers to about 8.0 micrometers and less than 2 percent from 2.5 micrometers to 50 micrometers. Zinc selenide (ZnSe) was used as the reference material because of its broad band transmission and low reflectance in the infrared. The ZnSe has an average reflectance of approximately 17 percent from 2.5 to 14 micrometers as shown by the ZnSe reference line. Total integrated scatter (TIS) is the measurement of the sum of the radiant energy scattered in all directions within a hemisphere. The measurements are graphically represented as percent reflectance versus wavelength. Measurements of the total integrated scatter are taken with a Beckman 5170 Spectrophotometer with integrating sphere.

EXAMPLE 2

Figure 5:
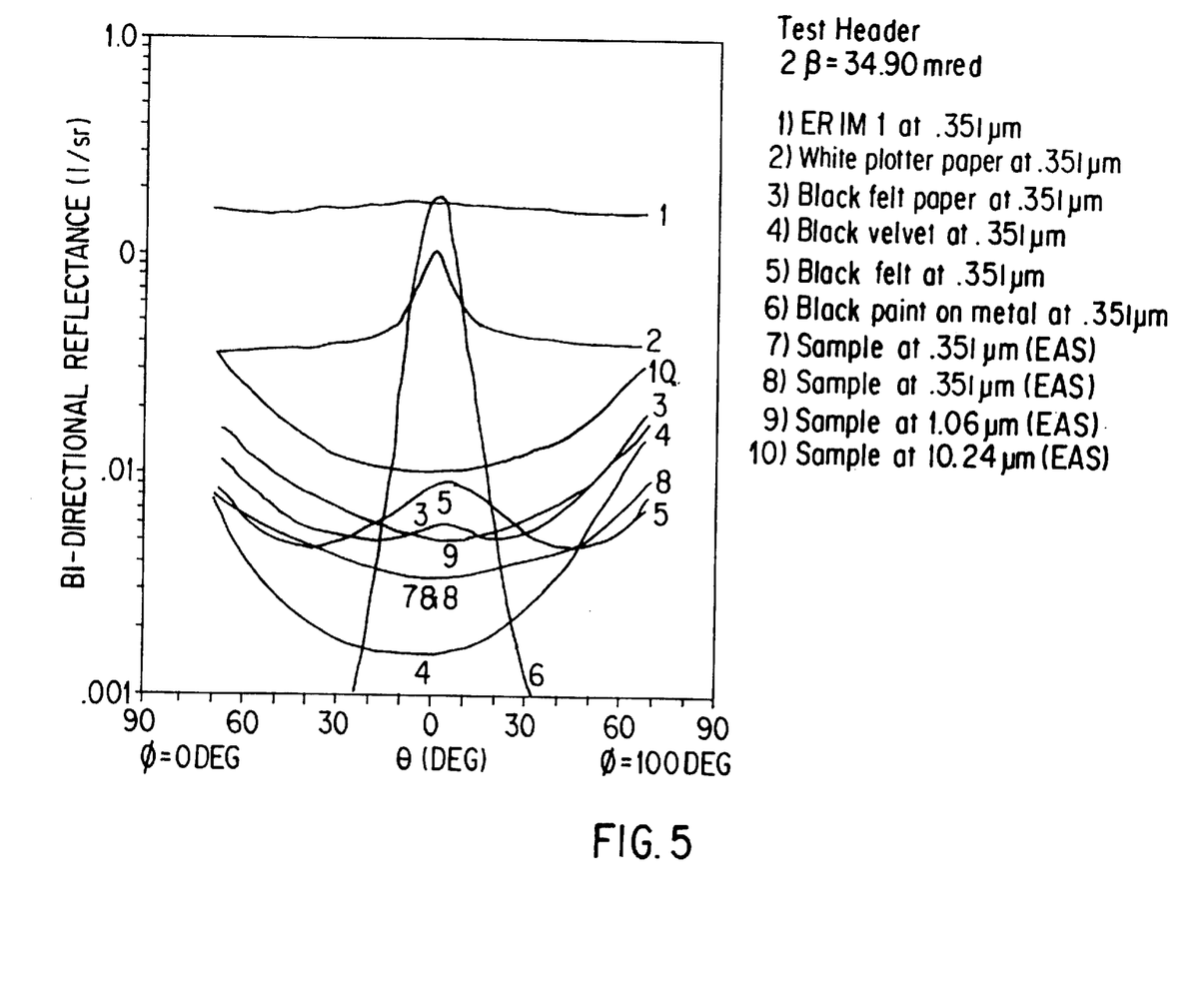
FIG. 5 is a graph of bidirectional reflectivity distribution function (BRDF) of an EAS surface, and several other commonly used non-reflective materials.

A second surface is prepared in accordance with the method set forth in Example 1. After oxidation and rinsing, this sample is tested for bidirectional reflectivity distribution function (BRDF), in comparison with several other common non-reflective surfaces. FIG. 5 demonstrates the highly improved characteristics obtained from the EAS surface, and the Lambertian behavior thereof.

This figure shows "Fixed-bistatic" BRDF measurements taken at ERIM Environmental Research Institute of Michigan. These measurements utilize a fixed source (Lasers) and fixed detectors which are positioned 45 degrees from the normal to the surface of the sample, which is 0 degrees. Three lasers were utilized for the measurements [UV, 0.4 micrometers, NIR, 1.06 micrometers, and IR (carbon dioxide laser), 10.24 micrometers]. The sample stage was rotated from the extreme left (−65 degrees) through the normal position (0 degrees), then to the extreme right (+65 degrees). The laser beams were first chopped for measurement stability, then passed through a beam splitter which was utilized for stability monitoring, and finally the beam was expanded and focused at the virtual image of the detector. Significantly, the BRDF profiles are substantially parallel, illustrating that the profile or shape does not change at varying wavelengths, although total reflectance increases with wavelength, as would be expected.

EXAMPLE 3

A third example comprises the utilization of an ordinary nickel plating process such as the commonly termed "Watts formulation", and the same waveform as described in Example 1, relative to copper plating. FIG. 1 demonstrates the highly disturbed morphology obtained, providing a very diffusive nickel surface. This surface is then coated with a thin layer of copper plating and subsequently oxidized in accordance with Example 1, to provide a highly absorptive copper oxide surface.

EXAMPLE 4

A fourth example provides an electroformed freestanding shape with a low surface reflectance. A polished mandrel of durable stainless steel is coated from the solution listed in Table 1, for about 12 hours, using conventional direct current plating. This heavy coating of smooth copper obtained is then the substrate for a dendritic coating subsequently obtained by the methods in Example 1 of this disclosure. Upon separation of the deposit from the stainless steel, a dendritic freestanding shape is obtained.

While the invention has been described by the preceding specification, it is recognized that the same may be varied in many ways. Such variations are not to be considered departures from the spirit and scope of the invention, and are intended to be within the scope of the following claims.

What is claimed is:

1. An optical apparatus including a substrate coated with a highly diffusive metal surface layer, said layer including a surface area having a microgeometric ratio greater than about 1000:1, wherein said surface layer is characterized by a redundant dendritic crystal growth pattern.

2. An optical apparatus including a substrate as set forth in claim 1, wherein said metal is selected from the group consisting of copper, nickel, silver, gold, iron, cobalt and cadmium.

3. An optical apparatus including a substrate as set forth in claim 2, wherein said metal is copper.

4. An optical apparatus including a substrate as set forth in claim 2, wherein said metal is nickel.

5. An optical apparatus including a substrate as set forth in claim 1, wherein said metal is copper.

6. An optical apparatus including a substrate as set forth in claim 1, wherein said metal is nickel.

* * * * *

UNITED STATES PATENT AND TRADEMARK OFFICE
CERTIFICATE OF CORRECTION

PATENT NO. : 5,817,422
DATED : October 6, 1998
INVENTOR(S) : Darell E. Engelhaupt It is certified that error appears in the above-identified patent and that said Letters Patent is hereby corrected as shown below:

| Column | Line | |
|---|---|---|
| 2 | 50 | Before "ultra-black" change "a" to --an--. |
| 3 | 25 | Change "vary" to --very--. |
| 3 | 57 | After "plated" delete "." (second occurrence). |
| 3 | 60 | After "part" change "," to --.--. |
| 4 | 22 | Change "aluminium" to --aluminum--. |
| 4 | 30 | After "applied" change "," to --.--. |
| 5 | 17 | Change "with" to --will--. |
| 6 | 27 | Change "radition" to --radiation--. |
| 6 | 29 | Change "stero" to --stereo--. |
| 6 | 51 | After "surfaces" insert --with--. |

UNITED STATES PATENT AND TRADEMARK OFFICE
CERTIFICATE OF CORRECTION

PATENT NO.    : 5,817,422
DATED         : October 6, 1998
INVENTOR(S)   : Darell E. Engelhaupt It is certified that error appears in the above-identified patent and that said Letters Patent is hereby corrected as shown below:

| Column | Line | |
|--------|------|---|
| 6 | 67 | Change "thus" to --this--. |
| 7 | 7  | Before "about" insert --to--. (2nd occur.) |
| 8 | 11 | Before "monitored" insert --is--. |

Signed and Sealed this

Fourteenth Day of December, 1999

Q. TODD DICKINSON

Attest:

Attesting Officer

Acting Commissioner of Patents and Trademarks